(12) United States Patent
Restall et al.

(10) Patent No.: US 9,931,744 B2
(45) Date of Patent: Apr. 3, 2018

(54) CARRYING UNIT FOR BLOWER ASSEMBLY

(71) Applicant: Crary Industries, Inc., West Fargo, ND (US)

(72) Inventors: Arran Restall, Louisville, KY (US); Wayne Spier, Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 277 days.

(21) Appl. No.: 14/557,731

(22) Filed: Dec. 2, 2014

(65) Prior Publication Data
US 2016/0152256 A1   Jun. 2, 2016

(51) Int. Cl.
| E01H 1/08 | (2006.01) |
| B25F 5/02 | (2006.01) |
| A47L 5/14 | (2006.01) |
| A01G 1/12 | (2006.01) |

(52) U.S. Cl.
CPC .............. B25F 5/021 (2013.01); A01G 1/125 (2013.01); A47L 5/14 (2013.01); E01H 1/0809 (2013.01); Y10T 137/6914 (2015.04)

(58) Field of Classification Search
CPC ......... A01G 1/125; A47L 5/14; E01H 1/0809; Y10T 137/6914
See application file for complete search history.

(56) References Cited

U.S. PATENT DOCUMENTS

| 4,118,826 A | * | 10/1978 | Kaeser | ................. | E01H 1/0809 |
| | | | | | 15/328 |
| 5,107,566 A | * | 4/1992 | Schmid | ................. | A47L 7/04 |
| | | | | | 15/328 |
| 5,294,063 A | * | 3/1994 | Bote | .................... | A01G 3/002 |
| | | | | | 15/329 |
| 5,735,018 A | * | 4/1998 | Gallagher | ............. | A01G 1/125 |
| | | | | | 15/328 |
| 6,618,897 B2 | * | 9/2003 | Lewis | .................. | A46B 13/001 |
| | | | | | 15/319 |
| 6,883,736 B1 | * | 4/2005 | Blatt | ..................... | A01C 15/04 |
| | | | | | 222/626 |
| 7,004,688 B2 | * | 2/2006 | Tasker | .................. | A01G 1/125 |
| | | | | | 406/38 |
| 7,841,044 B1 | | 11/2010 | Weihl et al. | | |
| 8,177,914 B2 | * | 5/2012 | Peters | .................. | E01H 1/0809 |
| | | | | | 134/25.1 |
| 2007/0136983 A1 | * | 6/2007 | Oberhofer | ............. | A01G 1/125 |
| | | | | | 15/330 |
| 2010/0133365 A1 | * | 6/2010 | Bailey | .................. | E01H 1/0809 |
| | | | | | 239/663 |

* cited by examiner

*Primary Examiner* — Kevin Murphy
(74) *Attorney, Agent, or Firm* — Wood, Phillips, Katz, Clark & Mortimer

(57) ABSTRACT

A carrying unit for a source of pressurized air having a frame and at least one wheel on the frame through which the frame can be supported upon and moved over a subj support surface. A conduit assembly is part of a pressurized air handling system on the frame and has an inlet for receiving pressurized air from a source and first and second spaced outlets for discharging pressurized air directed through the inlet. The pressurized air handling system further has an air control system that is changeable selectively into different states. By reason of changing states, the air control system causes at least one of: a) a different volume of air from the inlet to be directed to the first and second outlets; and b) a change in a direction of air discharging from one of the outlets.

15 Claims, 13 Drawing Sheets

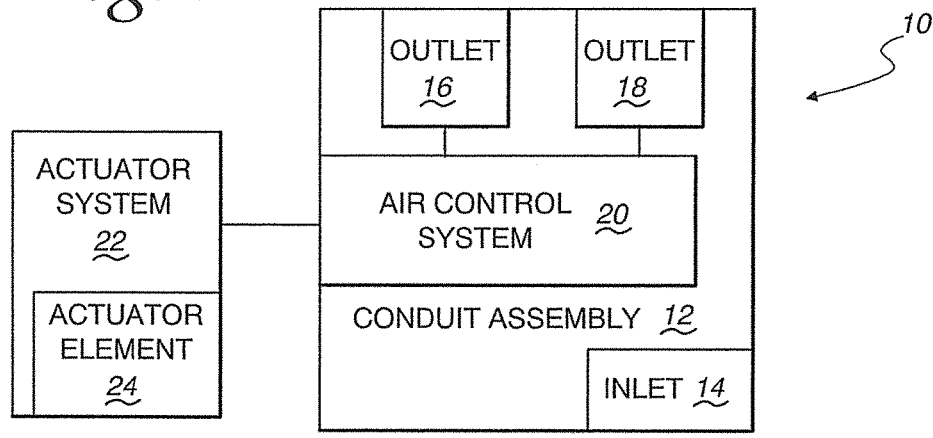
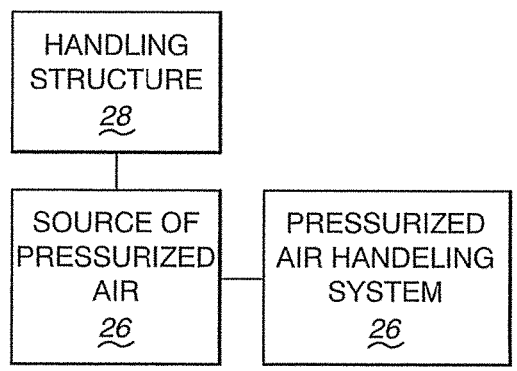

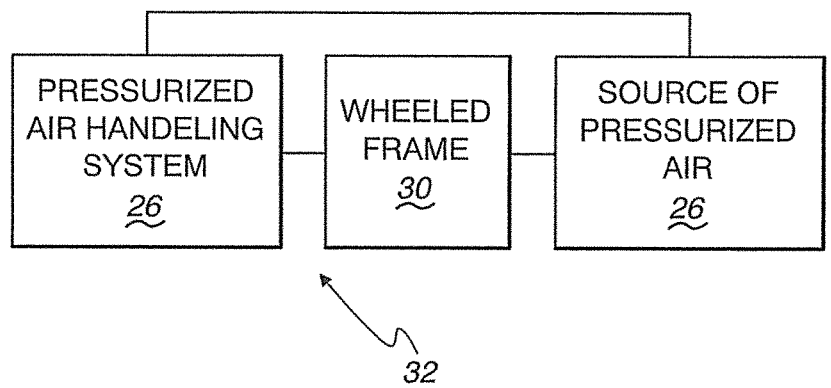
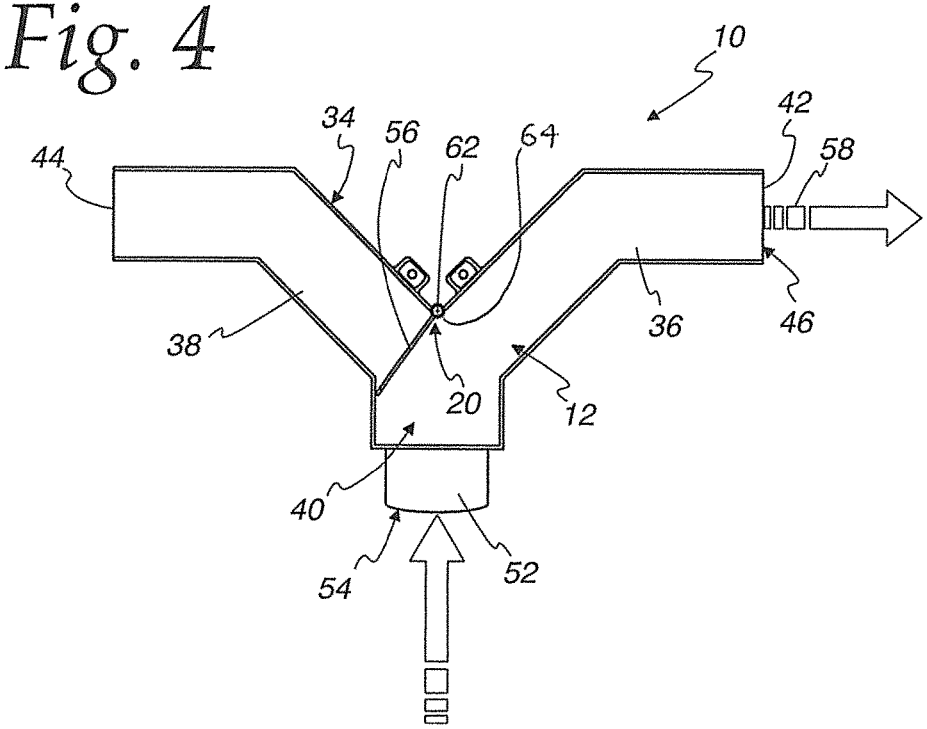

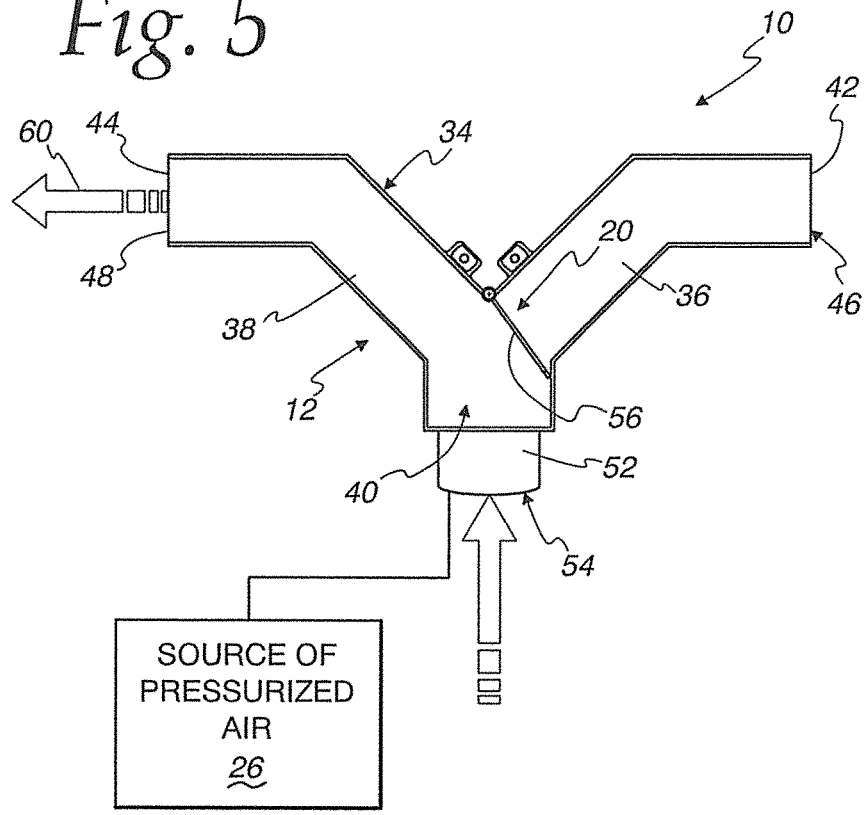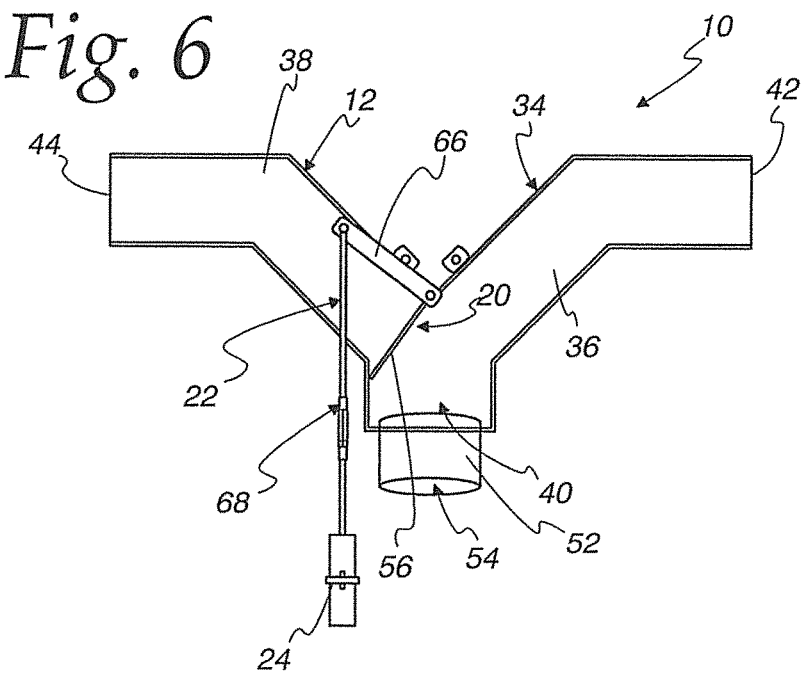

CARRYING UNIT FOR BLOWER ASSEMBLY

BACKGROUND OF THE INVENTION

Field of the Invention

This invention relates to landscaping equipment and, more particularly, to a portable piece of equipment made up of a blower assembly on a wheeled frame.

Background Art

Blower assemblies have been commonly incorporated into wheeled frames to define portable units that are used to distribute loose material on subjacent terrain. Typically, such landscaping equipment has a rear handle assembly with one or more gripping members that can be engaged by a user to apply forces to maneuver the unit. Front and rear, laterally spaced wheel pairs, or a tricycle wheel arrangement, support the unit and facilitate advancement thereof over the supporting subjacent surface.

The blower assembly that is incorporated into the wheeled frame has a fan assembly that is rotated by a drive, that most commonly is a gas operated engine. A housing defines a chamber within which the fan assembly operates and has an associated conduit at which pressurized air generated through the fan assembly is discharged in an air stream that exits in a generally straight flow pattern.

A common blower assembly design has a fixed discharge conduit orientation which causes the pressurized air to exit laterally, which is generally orthogonal to the normal fore-and-aft travel path utilized by most users. Users of this type of unit, while treating a substantial areal extent, normally take the same approach. That is, the user will advance the unit in a first straight line which causes material to be propelled by the pressurized air stream to one side. To progressively shift the loose material to the same one side, the user will repeatedly move the unit in parallel lines, while maintaining the orientation of the unit as the loose material progressively accumulates further to the one side. Some users choose to travel every other linear path portion by drawing the unit backwards. By reason of the fixed configuration, the user experiences limitations as to how he/she can efficiently treat a large areal space, and often resorts to inconvenient movements, such as the reverse drawing of the unit, described above.

While some units incorporate the ability to reconfigure the blower assembly so that the discharge direction for the pressurized air supply is changed, these structures are generally of a nature that this process is not capable of being performed easily and quickly. The user may have to repeatedly release the handle and walk around the unit to make an adjustment. To avoid this inconvenience, and in the interest of saving time, users may often decide not to take advantage of an adjusting capability and operate the unit in a single state while contending with the problems and inconveniences, some of which are noted above.

These shortcuts may prompt the user to operate the equipment in a manner whereby the overall quality of the ground treatment is compromised.

In spite of the fact that the blower technology in the agricultural area has been evolving for many decades, the above problems are contended with to this day. Blower assembly designs do not exist that are adequately versatile, practical to use, and affordable to those individuals and businesses that utilize this type of equipment.

SUMMARY OF THE INVENTION

In one form, the invention is directed to a carrying unit for a source of pressurized air. The carrying unit includes: a frame; at least one wheel on the frame through which the frame can be supported upon and moved over a subjacent support surface; and a pressurized air handling system. The air handling system includes a conduit assembly on the frame that has an inlet for receiving pressurized air from a source and first and second spaced outlets for discharging pressurized air directed through the inlet. The pressurized air handling system further includes an air control system that is changeable selectively into different states. The air control system is configured so that by reason of changing states the air control system causes at least one of: a) a different volume of air from the inlet to be directed to the first and second outlets; and b) a change in a direction of air discharging from one of the outlets.

In one form, the carrying unit for a source of pressurized air further includes an actuator system that is configured to be operable by a user to effect a change of state for the air control system.

In one form, the conduit assembly has a V-shaped conduit portion with legs of the "V" projecting from an apex region towards spaced free ends at which the first and second outlets are provided.

In one form, the conduit assembly has a main portion that communicates with the legs of the "V" adjacent the apex region and defines an overall "Y" shape in conjunction with the legs of the "V". The inlet is in this variation defined on the main portion.

In one form, the air control system has a first deflector that is movable between: a) a first position wherein pressurized air directed through the inlet is delivered substantially entirely to the first outlet; and b) a second position wherein pressurized air delivered through the inlet is delivered substantially entirely to the second outlet.

In one form, the air control system has a second deflector that is movable between first and second positions to at least one of: a) change a volume of air discharging from the first outlet with the first wall in its first position; and b) change a direction of air discharging at the first outlet with the first wall in its first position.

In one form, the carrying unit has a front and rear and laterally spaced sides. The carrying unit further includes a handle assembly with at least one gripping region that is configured to be engaged by a user situated behind the carrying unit and at which forces can be applied by a user to reposition the carrying unit relative to a subjacent support surface.

In one form, the carrying unit further includes an actuator system configured to be operable by a user to change the state of the air control system.

In one form, the actuator system has at least one actuator element on the handle assembly that is operable to change the state of the air control system.

In one form, the at least one wheel comprises a plurality of wheels.

In one form, the carrying unit has a front and rear and laterally spaced sides. The at least one wheel consists of first and second laterally spaced wheels and a third wheel spaced forwardly of the first and second wheels.

In one form, the carrying unit is provided in combination with a source of pressurized air.

In one form, the source of pressurized air is fixedly attached to the carrying unit to at all times be a single unit in conjunction with the carrying unit.

In one form, the source of pressurized air is configured to be supported for use on the back of a user and to selectively be: a) operatively positioned on the frame; and b) changed from the operative position to become fully separated from the carrying unit to be supported on the back of a user.

In one form, the frame defines an upwardly facing surface upon which the source of pressurized air is supported with the source of pressurized air operatively positioned.

In one form, the combination further includes a non-straight conduit section having ends that are connected one each to the source of pressurized air and the conduit assembly.

In one form, the frame defines an upwardly facing surface for supporting a source of pressurized air. The conduit assembly resides beneath the upwardly facing surface.

In one form, the air control system has a third deflector that is movable between first and second positions to at least one of: a) change a volume of air discharging from the second outlet with the first deflector in its second position; and b) change a direction of air discharging at the second outlet with the first deflector in its second position.

In one form, the second and third deflectors are interconnected so that movement of one of the second and third deflectors causes movement of the other of the second and third deflectors.

In one form, the second deflector is movable guidingly around an axis between its first and second positions.

In one form, a pressurized air handling system, including the conduit assembly and air control system described above, is provided in combination with a source of pressurized air configured to direct pressurized air to the inlet on the conduit assembly.

In one form, the conduit assembly has a main body. The air control system further includes a first deflector unit configured to be connected to the main body and to change a direction of air discharging from the one outlet to a first direction.

In one form, the air control system further includes a second deflector unit configured to be connected to the main body in place of the first deflector unit and to change a direction of air discharging from the one outlet from the first direction to a second direction.

BRIEF DESCRIPTION OF THE DRAWINGS

FIG. 1 is a schematic representation of a pressurized air handling system, according to the present invention;

FIG. 2 is a schematic representation of one type of system into which the pressurized air handling system in FIG. 1 can be incorporated;

FIG. 3 is a schematic representation of another type of system into which the pressurized air handling system can be incorporated;

FIG. 4 is a bottom view of one specific form of air handling system, as shown generically in FIGS. 1-3, and with an air control system thereon in one state in which incoming pressurized air is delivered to one of two outlets;

FIG. 5 is a view as in FIG. 4 with the air control system in another state wherein incoming air is caused to be delivered to an outlet different than in FIG. 4;

FIG. 6 is a view as in FIG. 4 with the air control system in the same state and showing an actuator system therefor;

DETAILED DESCRIPTION OF THE PREFERRED EMBODIMENT

Figure 7:
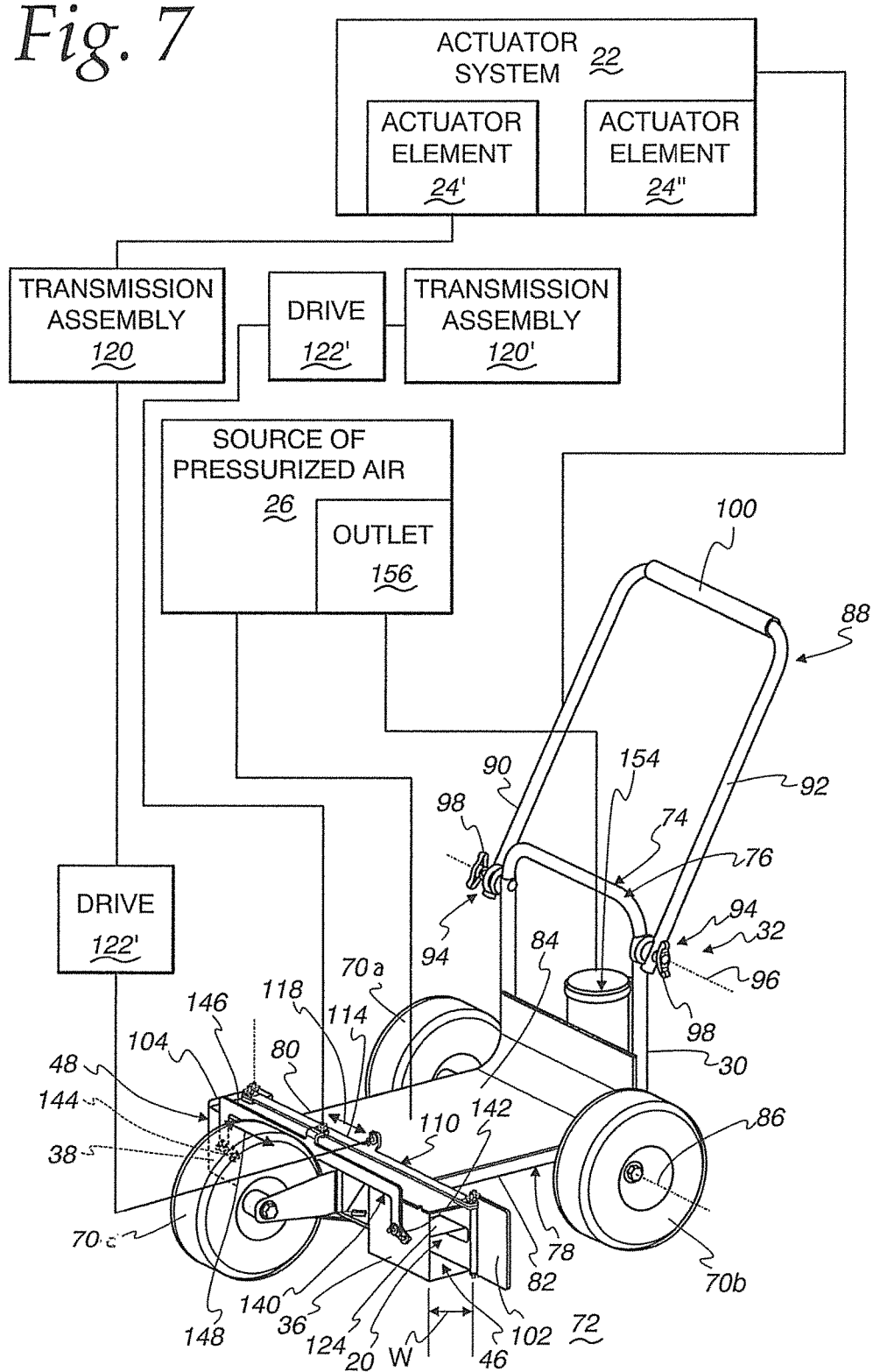
FIG. 7 is a partially schematic, perspective view of one specific form of system, as shown in FIG. 3, and made up of a carrying unit for a source of pressurized air.

One aspect of the present invention is the provision of a pressurized air handling system, as shown in schematic form at 10 in FIG. 1. The air handling system consists of a conduit assembly 12 having at least one inlet 14 for pressurized air and at least two outlets 16, 18 from which air incoming through the inlet 14 can be controllably discharged. An air control system 20 is configured to be changeable selectively into different states. By reason of changing the state of the air control system 20, at least one of: a) a different volume of air from the inlet 14 can be directed to one or both of the outlets 16, 18; and b) a change in a direction of air discharged from one of the outlets 16, 18 can be effected. Through an actuator system 22, a user can selectively change the state of the air control system 20. Preferably, the actuator system 22 has an actuator element 24 that can be operated remotely from the air control system 20 by the user without the user's being required to otherwise interact with the air handling system 10 to change the state of the air control system 20.

The air handling system 10 may be used in conjunction with any structure having an associated source of pressurized air to define different forms of equipment. The integration of the air handling system 10 and source of pressurized air may be permanently effected or carried out so that the source of pressurized air can be selectively separated, as to be independently usable.

One category of equipment is shown in FIG. 2 with the pressurized air handling system 10 incorporated. In FIG. 2, the source of pressurized air 26 is intended to encompass any relatively lightweight structure that can be readily lifted by a user. Handling structure 28 facilitates user lifting and maneuvering of the source of pressurized air 26 with the associated pressurized air handling system 10. The handling structure 28 may be a backpack arrangement through which the source of pressurized air 26 can be supported on a user's back. Alternatively, the handling structure 28 may include one or more grips/handles.

Another category of equipment into which the pressurized air handling system 10 may be incorporated is shown in FIG. 3. In FIG. 3, a wheeled frame 30 is provided to be rolled against and relative to a subjacent surface by a user. The source of pressurized air 26 is provided on the wheeled frame. The source of pressurized air 26 may be fixedly attached to the wheeled frame 30 to be at all times a single unit in conjunction with the wheeled frame. Alternatively, the source of pressurized air 26 may be operatively mounted upon the wheeled frame 30 so that it might be separated therefrom, as to be independently usable. In both configurations, the pressurized air handling system 10 and wheeled frame 30 make up a carrying unit 32 for the source of pressurized air 26.

The schematic representation of the components in FIGS. 1-3 is intended to encompass the specific components depicted and described herein, and how they interact. The schematic showing is also intended to encompass virtually a limitless number of different variations of those components and their interaction as would be apparent to someone skilled in the art based upon the teachings herein. The specific forms of the invention described hereinbelow are exemplary only of the broad concepts contemplated by the generic showings in FIGS. 1-3.

Referring now to FIGS. 4-6, one exemplary form of pressurized air handling system 10 is shown. The conduit assembly 12 has a V-shaped portion 34 with separate legs 36, 38 of the "V" projecting from an apex region, generally at 40, towards spaced, free ends 42, 44, respectively, at which first and second outlets 46, 48 are defined.

A main conduit assembly portion 52 communicates with the legs 36, 38 at the apex region 40 and defines an inlet 54 for pressurized air from the source 26, which may take any well-known configuration. In this embodiment, the main conduit assembly portion 52 extends from the apex region 40 so as to define in conjunction with the legs 36, 38 an overall "Y" shape.

The air control system 20 consists of a first deflector 56 that is movable between a first position, shown in FIGS. 4 and 6, and a second position, as shown in FIG. 5, to change the state of the air control system 20.

The first deflector 56 is in the form of a flat wall/plate having a shape substantially matched to the cross-sectional shape of each of the legs 36, 38 in the vicinity of where the deflector 56 is located. With the first deflector in the first position, incoming flow of pressurized air through the inlet 54 is substantially blocked by the deflector 56 from moving into the leg 38. Substantially the entire volume of incoming pressurized air is thus caused to move to the first outlet 46 at which a pressurized air flow stream exits in a flow direction as indicated by the arrow 58.

By changing the deflector 56 from its first position into its second position, flow of incoming pressurized air is blocked by the deflector 56 from moving into the leg 36, whereupon substantially the entire volume of incoming air flows into the leg 38 and to and through the second outlet 48 in an air stream exiting in a flow direction indicated by the arrow 60.

In this embodiment, the deflector 56 pivots about an axis 62, defined by a pin 64, between its first and second positions.

The actuator system 22 allows a user to change the position of the deflector 56, and thus the state of the air control system 20, preferably from a location spaced from where the deflector 56 is located. In this embodiment, the actuator system consists of an elongate control arm 66 that is connected to the deflector 56 to pivot as one piece therewith around the axis 62.

The actuator system 22 further includes the actuator element 24 which, in this embodiment, is identified as a repositionable mechanical element. The actuator element 24 effects movement of the control arm 66 through a suitable linkage or cable arrangement at 68. The depicted showing is intended to be generic to any conventional-type linkage and to an alternative cable system such as one that utilizes a slidable core, or the like.

In FIGS. 7-11, a specific form of the carrying unit 32, shown schematically in FIG. 3, is depicted together with the source of pressurized air 26. In this embodiment, the frame 30 is supported upon three wheels 70a, 70b, 70c in a tricycle arrangement. It should be understood that the generic showing of the frame 30 in FIG. 3 is intended to encompass a greater, or lesser, number of wheels, which would allow the frame to be advanced by being pushed by a user over the subjacent support surface 72.

The frame 30 has a tubular form with a main, U-shaped portion 74 bent to define a vertical frame part 76 and a horizontal frame part 78. The legs 80, 82 of the "U", making up the main portion 74, are spanned laterally by a wall 84, which covers the horizontal frame part 78 and extends partially up the vertical frame part 76.

The laterally spaced wheels 70a, 70b cooperatively support the rear of the frame 30 and turn around a common horizontal axis 86. The wheel 70c is located at the front of the frame 30 and resides laterally approximately midway between the rear wheels 70a, 70b.

The carrying unit 32 has a handle assembly 88 that has a "U" shape opening forwardly. Spaced legs 90, 92 project forwardly and straddle the legs 80, 82 near the top of the vertical frame part 76. These legs 80, 90 and 82, 92 are respectively joined through like, conventional, connector arrangements 94 through which the handle assembly 88 can be moved around a horizontal axis 96 relative to the vertical frame part 76. Locking knobs 98 can be turned in opposite directions to fix and loosen this connection, thereby allowing a user to select and fix a desired orientation of the handle assembly 88.

The base of the "U" on the handle assembly 88 defines a gripping region at 100 that is configured to be engaged by a user situated behind the carrying unit 32. Forces can be applied by a user at this location to reposition the carrying unit 32 relative to the subjacent surface 72.

The above-described pressurized air handling system 10 may be incorporated into the frame 30 in substantially the same form as shown in FIGS. 4-6. As depicted in FIGS. 7-11, the air handling system 10 is modified with additions to the air control system 20 to make the air handling system 10 more versatile. The deflector 56 is incorporated into the conduit assembly 12 as previously described, and operates in the same fashion. The modifications affect how the air can be controlled as it discharges from the outlets 46, 48. These modifications relate to the air control system 20, as shown schematically in FIG. 1.

More specifically, the air control system 20 further includes second and third deflectors 102, 104, respectively at the first and second outlets 46, 48. The deflectors 102, 104 interact with their respective conduit assembly legs 36, 38 in like fashion.

Figure 11:
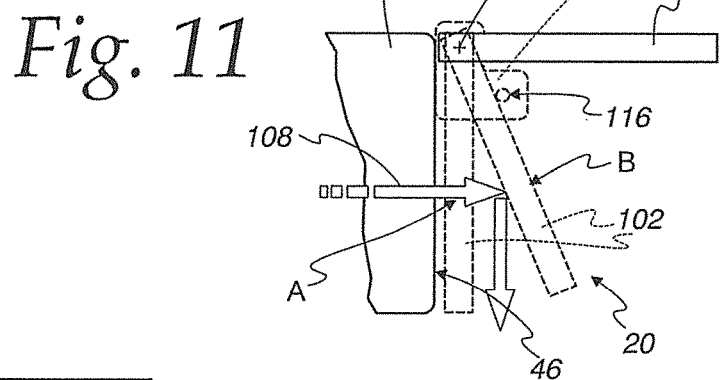
FIG. 11 is an enlarged, fragmentary view of another deflector at the same outlet as in FIG. 10, but not shown in FIG. 10, and repositionable to change the characteristics of the discharge flow.

Exemplary deflector 102 is mounted for pivoting movement relative to its associated conduit assembly leg 36 about a vertically extending axis 106. The deflector 102 is movable between a fully open position, as shown in solid lines in FIG. 11, and a fully closed position, as shown in FIG. 11 with the deflector 102 in dotted lines at A. In the dotted line position at B, the deflector 102 is between the fully open and closed positions. The deflector 102 can be moved in a range of different positions between fully open and fully closed.

By changing the position of the deflector 102, the volume of pressurized air that is discharged over any given time period is likewise changed. As the deflector 102 moves, the effective cross-sectional area at the outlet 46 changes.

Additionally, as the deflector 102 repositions, the direction of air discharging at the outlet 46 likewise changes. For example, with the deflector 102 in the B position, the exiting stream of pressurized air is deflected in the path indicated by the arrow 108 in a forward direction.

The deflectors 102, 104 may be operable independently. In the depicted embodiment, they are interconnected by a linkage at 110 so that opening movement of one of the deflectors 102, 104 causes a closing movement of the other of the deflectors 102, 104. To accomplish this, exemplary deflector 102 is fixed to a rocker arm 112 that is pivotably joined to a drive link 114 at the location at 116 in FIG. 11. Side-to-side translation of the drive link 114, as indicated by the double-headed arrow 118, causes the simultaneous movement of the deflectors 102, 104, thereby to change the state of the air control system 20. As seen in FIG. 7, the deflector 104 is in the fully closed position with the deflector 102 in the fully open position. Translation of the drive link 114 into the page in FIG. 7 reverses this relationship.

An actuator element 24' is provided on the actuator system 22 and is preferably located on the handle assembly 88 at a location readily accessible from where the user's hands reside while grasping the gripping region 100. The actuator element 24', through a transmission assembly 120, operates a drive 122 for the drive link 114. The actuating elements may be strictly mechanical or may be electromechanical in nature.

The drive link 114 may be manually controlled by an operator by directly grasping and moving the link 114. The deflectors 102, 104 might be constructed to be movable independently of each other through direct or remote actuation.

The air control system 20 further includes fourth and fifth deflectors 124, 126, respectively associated with the conduit assembly legs 36, 38 at their respective outlets 46, 48. The deflectors 124, 126 have the same construction, with representative deflector 124 described in detail herein.

The deflector 124 has a flat wall 128 that spans the fore-and-aft width W (FIG. 7) of the passageway 130 within the conduit assembly leg 36, adjacent the outlet 46. The deflector 124 has downturned ends 132 (one shown in FIG. 10) which are used to mount the wall 128 in an operative position within the passageway 130. Through a post 134, extending through the ends 132 and into the leg 36, the deflector 124 is mounted for pivoting movement around a horizontally extending axis 136. The deflector 124 is pivotable around the axis 136 through a plurality of positions, with one such position indicated in solid lines in FIG. 10, and another position indicated in dotted lines in that same Figure.

In the solid line position, the flat wall 128 is substantially horizontally situated to act as a vane past which the discharging pressurized air flows without any significant disruption. Accordingly, a substantially full flow volume is achieved at the outlet 46.

In the dotted line position, the wall 128 on the deflector 124 effectively reduces the area at the outlet 46 and additionally directs the discharging air in a downward direction, as indicated by the arrow 138.

Accordingly, by this movement the air control system 20 has a change in state which causes a different volume of pressurized air to be discharged over any given time period and changes the direction of that discharging air stream.

The deflectors 124, 126 could be independently operable. In the depicted embodiment, they are interconnected and simultaneously moved through a drive linkage 140. The drive linkage 140 includes an exposed pivot arm 142 that moves with the deflector 124 and a like pivot arm 144 that moves with the deflector 126. A drive link 146 is pivotably connected to each of the pivot arms 142, 144 and is movable back and forth laterally, as indicated by the double-headed arrow 148, to simultaneously change the positions of the deflectors 124, 126. The depicted interconnection causes the opposite pivoting movement to be effected by the interconnected deflectors 124, 126 as the drive link 146 shifts. That is, as one pivots to deflect discharge flow down, the other pivots to deflect discharge flow up.

This arrangement might be changed so that the deflectors 124, 126 pivot to deflect discharge flow in the same manner at their respective outlets 46, 48.

The drive link 146 is preferably controlled by an actuator element 24" on the actuator system 22, through a transmission assembly 120' and drive 122', corresponding to the above-described transmission assembly 120 and drive 122.

Manual control of the deflectors 124, 126 by directly grasping and moving the same is also contemplated.

Figure 8:
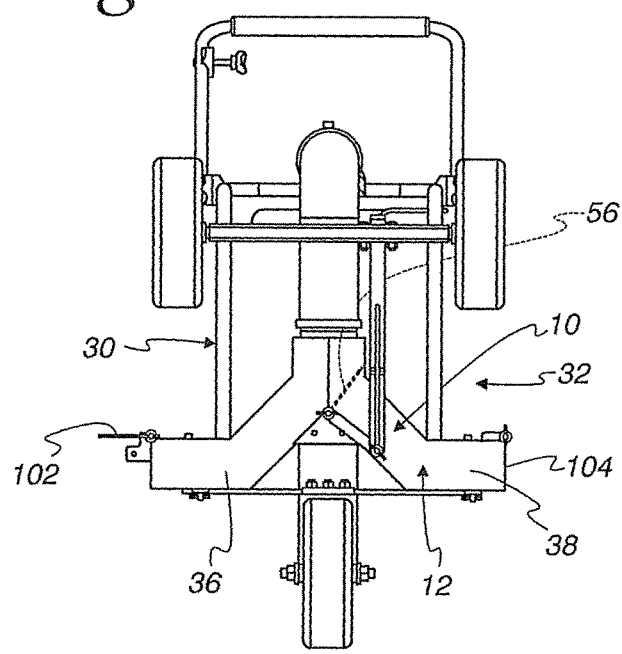
FIG. 8 is a reduced, bottom view of the system in FIG. 7.
Figure 9:
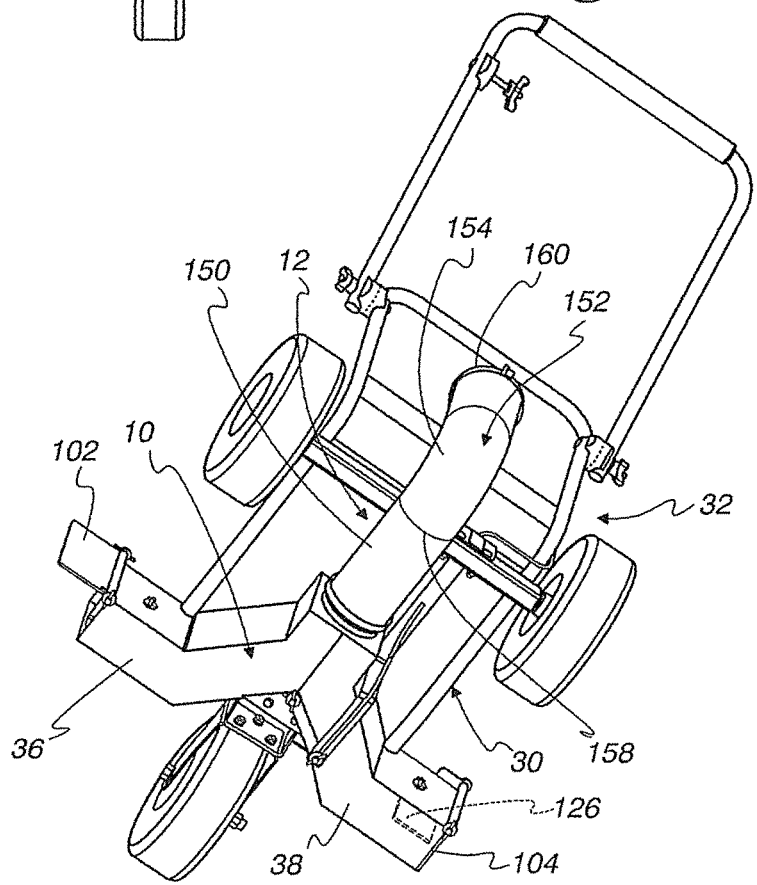
FIG. 9 is a bottom perspective view of the system shown in FIGS. 7 and 8.
Figure 10:
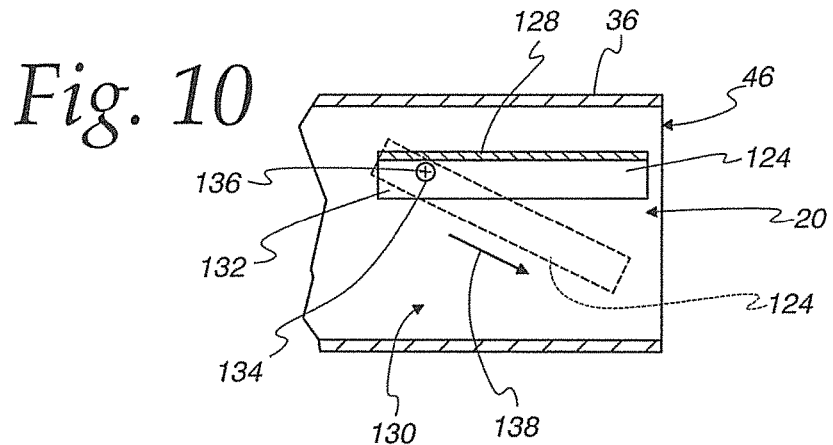
FIG. 10 is an enlarged, fragmentary, cross-sectional view of one outlet on the conduit assembly in FIGS. 7-9 and showing a deflector that is repositionable to change characteristics of the discharge flow.

As seen in FIG. 9, the conduit assembly 12 resides underneath the wall 84. As seen in FIGS. 8 and 9, the main conduit assembly portion 52 may be extended by a conduit length 150 which in turn extends into an adaptor 152, including a 90° elbow 154, which thereby relocates the inlet location for the conduit assembly 12 to the rear of the carrying unit 32 at 54', whereby an outlet 156 for pressurized air generated by the source 26 can be conveniently connected. As seen in FIG. 9, the adaptor 152 defines a conduit section with ends 158, 160, respectively connected to the conduit assembly 12 and source of pressurized air 26.

The source of pressurized air 26 might be integrated into the carrying unit 32 at the time of manufacture or thereafter. That is, the source of pressurized air 26 may be permanently fixed to the carrying unit 32 to at all times be a single unit in conjunction therewith.

Figure 12:
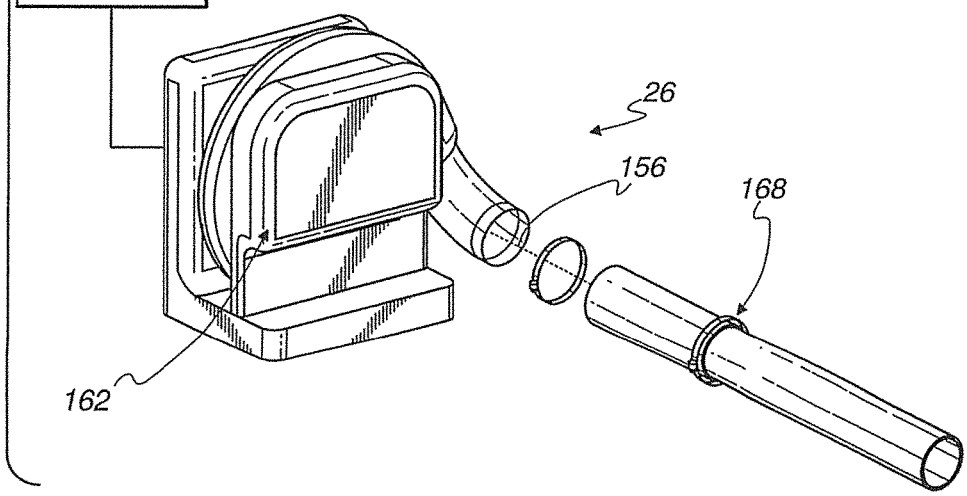
FIG. 12 is an exploded, perspective view of one form of a source of pressurized air that can be reconfigured to be operatively positioned on the carrying unit in FIGS. 7-11.
Figure 13:
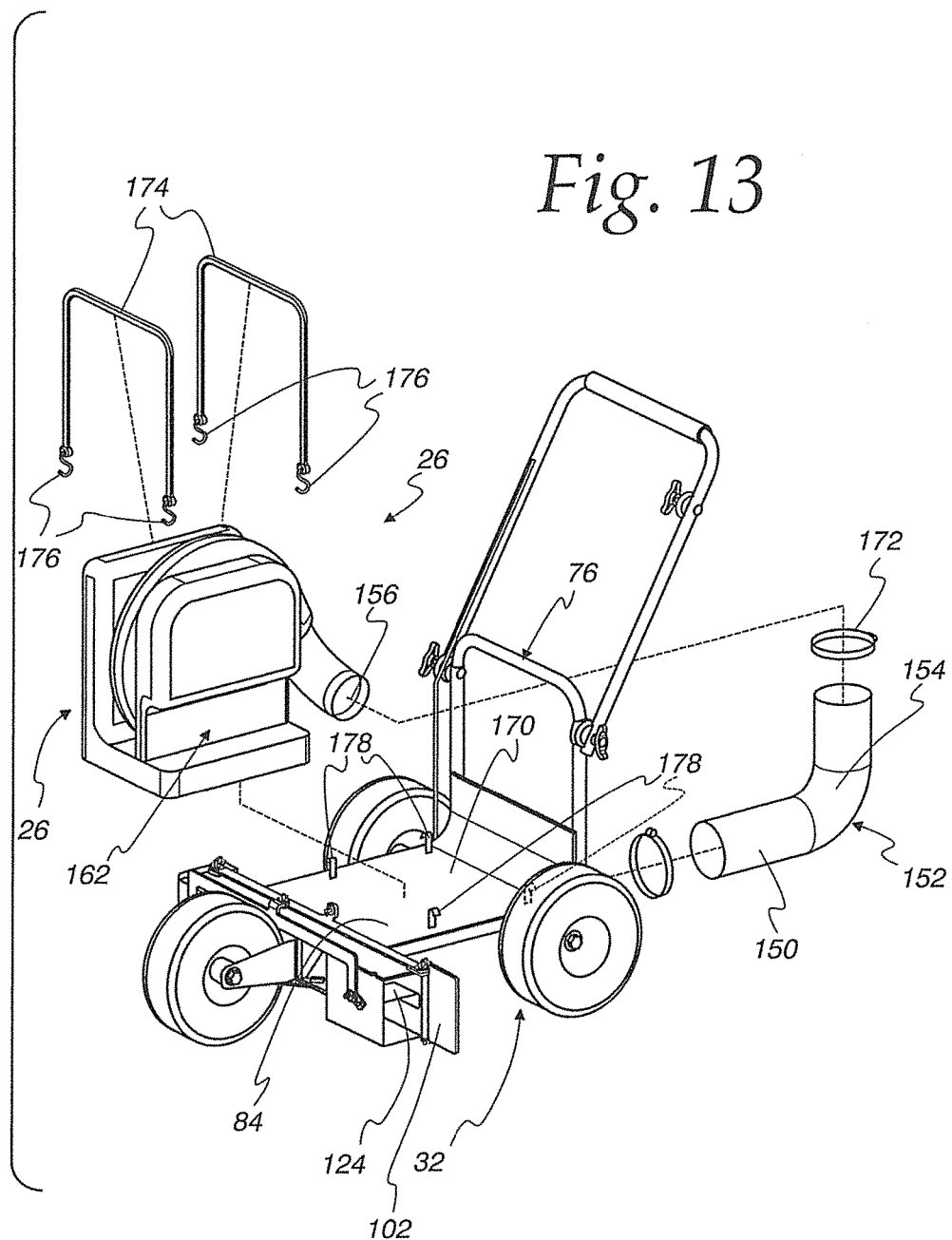
FIG. 13 is an exploded, perspective view of the source of pressurized air in FIG. 12 in relationship to the carrying unit in FIGS. 7-11.
Figure 14:
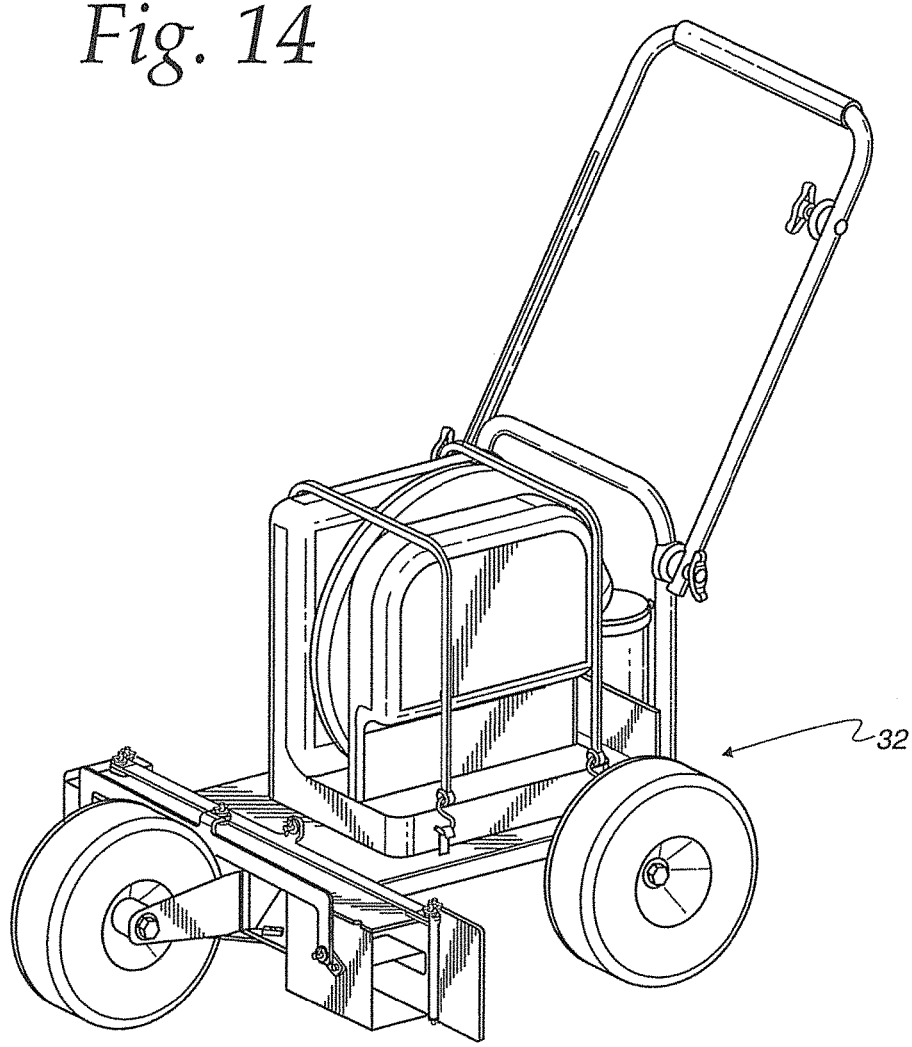
FIG. 14 is an enlarged view as in FIG. 13 with the source of pressurized air in FIG. 12 operatively positioned on the carrying unit.
Figure 15:
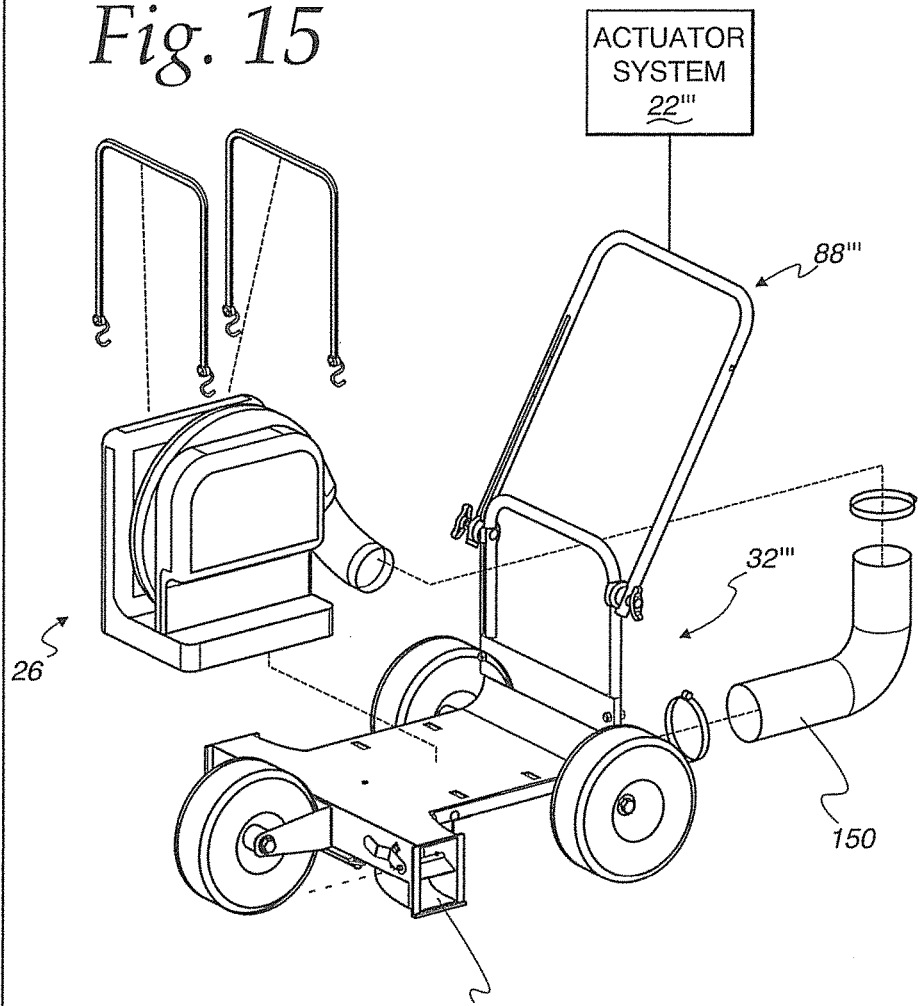
FIG. 15 is a view as in FIG. 13 and showing a modified form of carrying unit, according to the invention.
Figure 16:
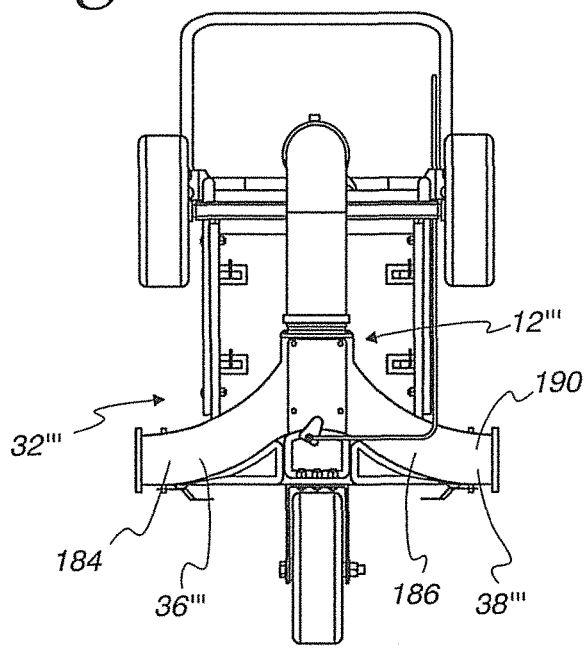
FIG. 16 is a reduced, bottom view of the system in FIG. 15 with the source of pressurized air operatively connected to the carrying unit.
Figure 17:
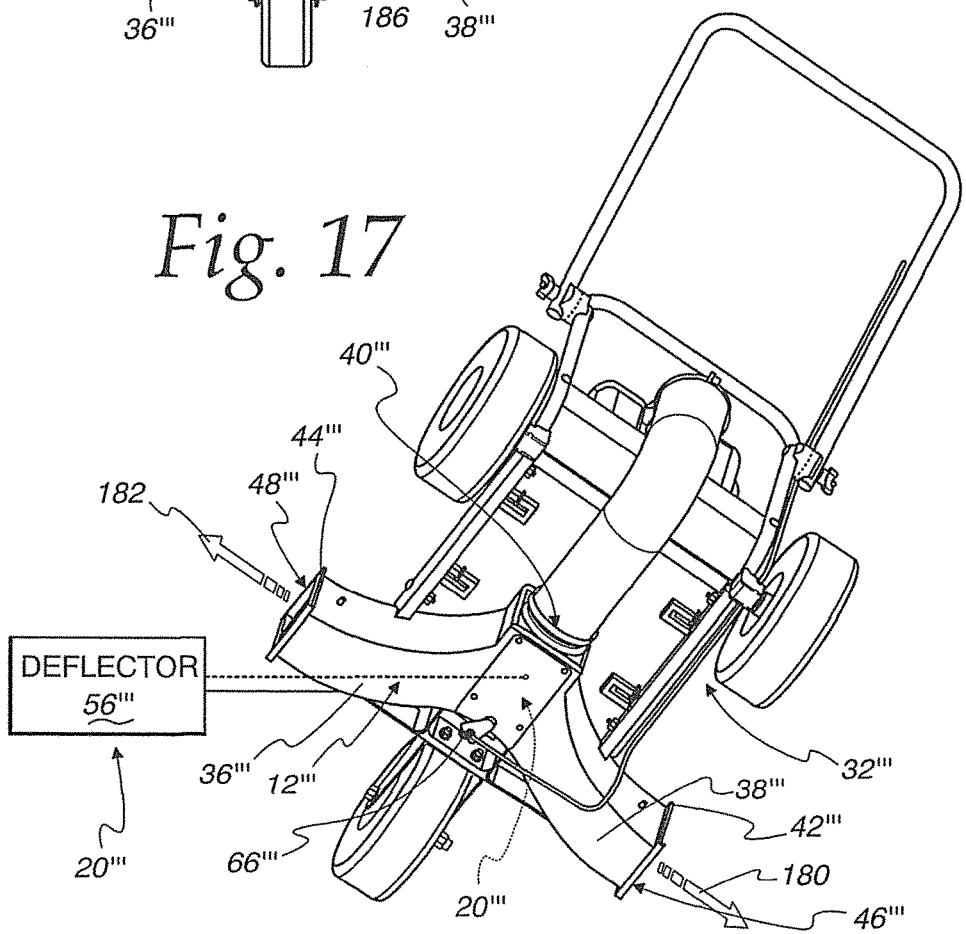
FIG. 17 is a bottom perspective view of the system in the FIG. 16 state.

Alternatively, as shown in FIGS. 12-14, a specific form of the source of pressurized air 26, configured to be used independently of the carrying unit 32, may be removably operatively positioned upon the carrying unit 32, as shown in FIG. 14. The source of pressurized air 26 depicted is a self-contained blower assembly with a main housing 162 configured to be placed against a user's back and maintained thereon by suitable back mounting structure, as shown schematically at 164 in FIG. 12. The back mounting structure 164 may be in the form of hooks, straps, etc.

Preparatory to mounting, a discharge tube 168 is separated from the housing 162, thereby exposing the outlet 156. The housing 162 can be placed against a flat upwardly facing surface 170 on the wall 84, which situates the outlet 156 behind the vertical frame part 76. The adaptor 152 can then be connected through a restrictable clamp 172 at the outlet 156 on the source of pressurized air 26. This connection alone may stably maintain the source of pressurized air 26 operatively positioned.

Optionally, extendable, flexible, elongate connectors/straps 174 with S-hooks 176 on their ends may be wrapped against the housing 162 and connected to frame mounts 178 through the S-hooks to further secure the source of pressurized air 26 to the carrying unit 32.

By releasing the straps 174 and disconnecting the adaptor 152, the source of pressurized air 26 can be fully separated from the carrying unit 32 to be independently usable.

In FIGS. 15-21, a modified form of carrying unit, according to the present invention, is shown at 32'''. In the following description, parts on the carrying unit 32''', corresponding to those on the carrying unit 32 but modified in any manner, will be identified with the same reference numeral with the addition of a "'''" designation.

The carrying unit 32''' cooperates with the source of pressurized air 26 in substantially the same way that the carrying unit 32 cooperates therewith. The carrying unit 32''' differs from the carrying unit 32 primarily with respect to how the conduit assembly 12''' and air control system 20''' are constructed.

The conduit assembly 12''' has separate legs 36''', 38''' which project towards free ends 42''', 44''', respectively, at which first and second outlets 46''', 48''' are defined. An apex region at 40''', from which the legs 36''', 38''' project, communicates with a conduit length 150''' that delivers air from the pressurized air source 26. Pressurized air discharges in streams in opposite lateral directions from the outlets 46''', 48''' as indicated by the arrows 180, 182.

The legs 36''', 38''' respectively have continuously curved walls 184, 186 as compared to the prior design which uses angled, flat wall portions to cooperatively produce a curved flow path.

The conduit assembly 12''' has an associated deflector 56''' that is not shown in detail but operates in substantially the same fashion as the deflector 56 and is movable between corresponding first and second positions to selectively control delivery of discharging pressurized air to the outlets 46''', 48'''. An externally exposed operating/control arm 66''' is used to pivot the deflector 56''' between its first and second positions.

In place of the deflectors 102, 104 on the air control system 20''', deflectors/deflector units 188a, 188b are selectively utilized at the outlets 44''', 46'''. Each of the deflector units 188a, 188b has an elbow shape, with the deflector units 188a differing from the deflector units 188b by reason of their bend angles.

The deflector units 188a, 188b may be permanently integrated into the conduit assembly 12'''. More preferably, the deflector units 188a, 188b are designed to be interchangeably attached to a main body 190 of the conduit assembly 12''' whereby the operating characteristics of the carrying unit 32''', with the source of pressurized air 26 operatively mounted thereon, can be changed.

To accomplish this, the main body 190 at the exemplary outlet 48''' is provided with a pair of vertically extending, elongate rails 192a, 192b that are in spaced, parallel relationship. A horizontally extending ledge 194 spans the rails 192a, 192b at the bottom thereof.

The deflector unit 188a has vertically extending slots 196a, 196b, each to accept one of the rails 192a, 192b.

Figure 21:
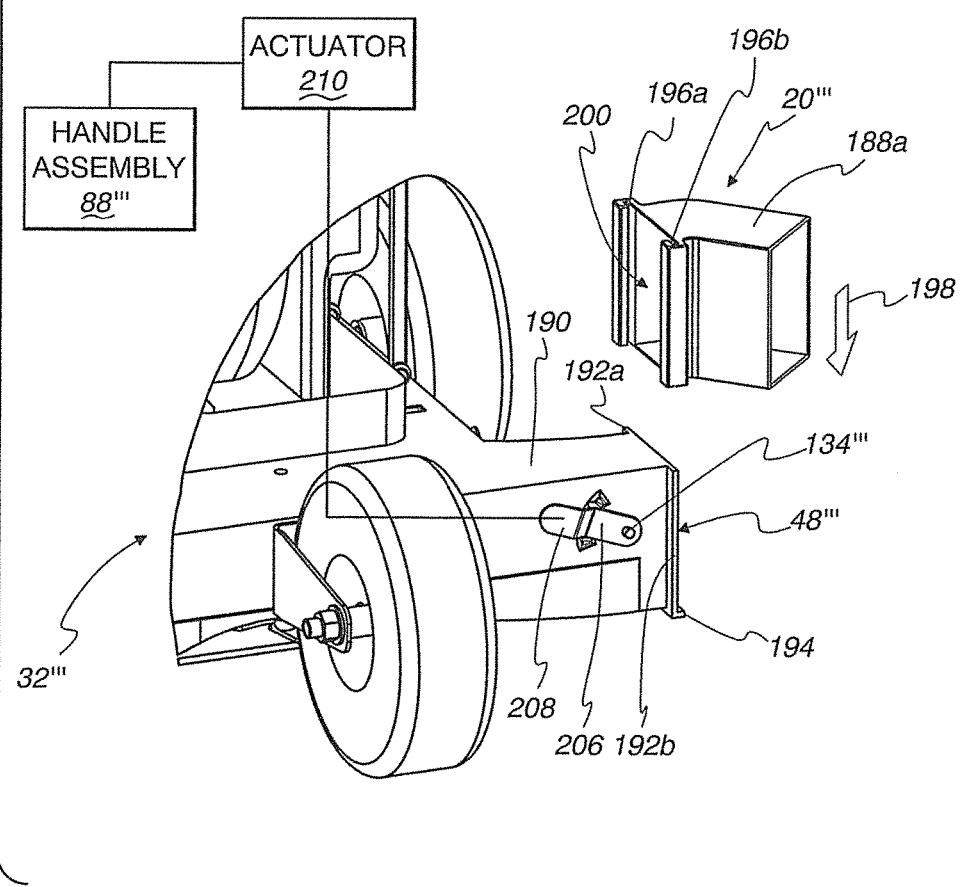
FIG. 21 is an enlarged, fragmentary, perspective view of an outlet region at one side of the unit in FIGS. 15-20 and with the deflector unit of FIG. 18 in a separated, pre-assembly position.

With the deflector unit 188a fully separated from the main body 190 and in a pre-assembly position, as shown in FIG. 21, wherein the rails 192a, 192b and slots 196a, 196b are aligned, the deflector unit 188a can be advanced downwardly in the direction of the arrow 198. As this occurs, the rails 192a, 192b move guidingly in the slots 196a, 196b until the deflector unit 188a abuts to the ledge 194, which thereby arrests its downward movement consistently in a fully assembled position. In the fully assembled position, an inlet opening 200 to the deflector unit 188a is in full registration with the outlet 48'''.

Figure 18:
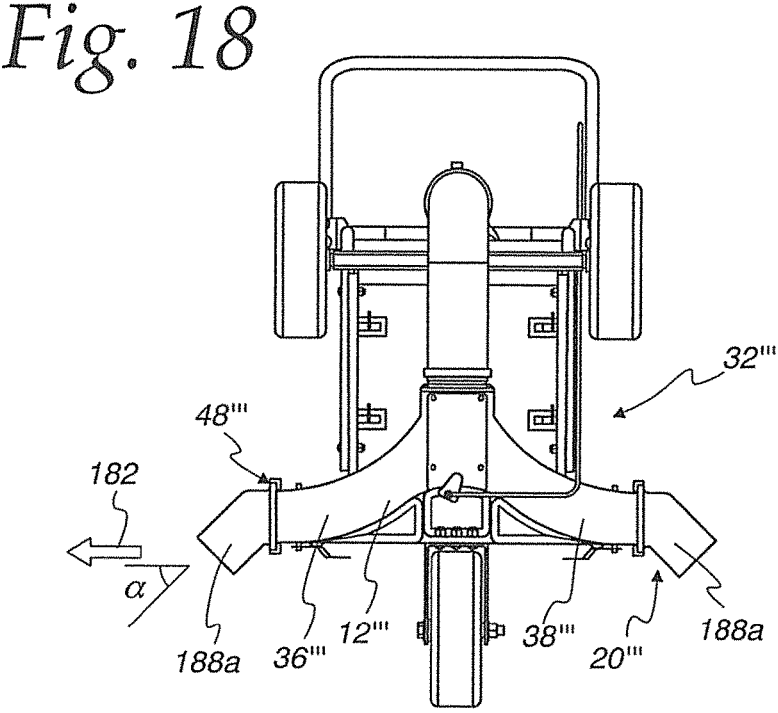
FIG. 18 is a bottom view of the system in the state in FIGS. 16 and 17 and with one form of a deflector unit attached to separate outlets.

As shown in FIG. 18, the deflector unit 188a causes the outflow of air at the outlet 48''' to deflect from the lateral direction, as indicated by the arrow 182, forwardly through an angle α. The angle α may vary, but in the depicted embodiment is on the order of 45°.

Figure 19:
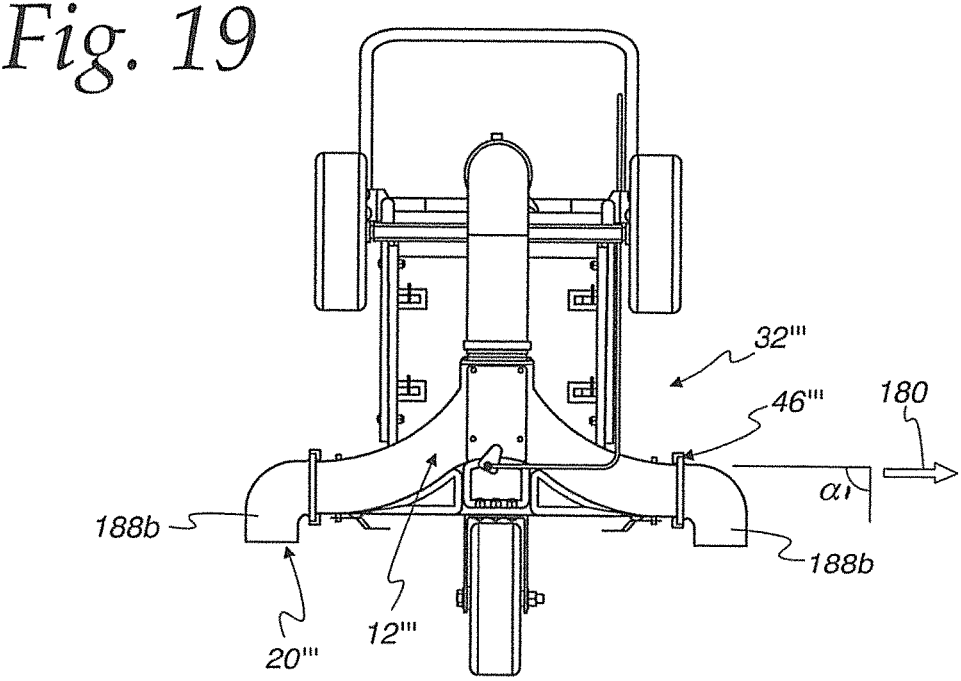
FIG. 19 is a view as in FIG. 18 with a different configuration of deflection unit attached at the outlets.

As shown in FIG. 19, each deflector unit 188b, as shown at the exemplary outlet 46''', deflects the outflow of pressurized air thereat from the lateral direction, indicated by the arrow 180, forwardly through the angle α1 that is on the order of 90°.

The deflector units 188a, 188b may be interchangeably used at either outlet 46''', 48'''. Other deflector units (not shown) might be utilized to change the outflow direction in a different manner. For example, a deflector unit might change the flow direction in a vertical arc, as opposed to the horizontal arc effected through the deflector units 188a, 188b.

Figure 20:
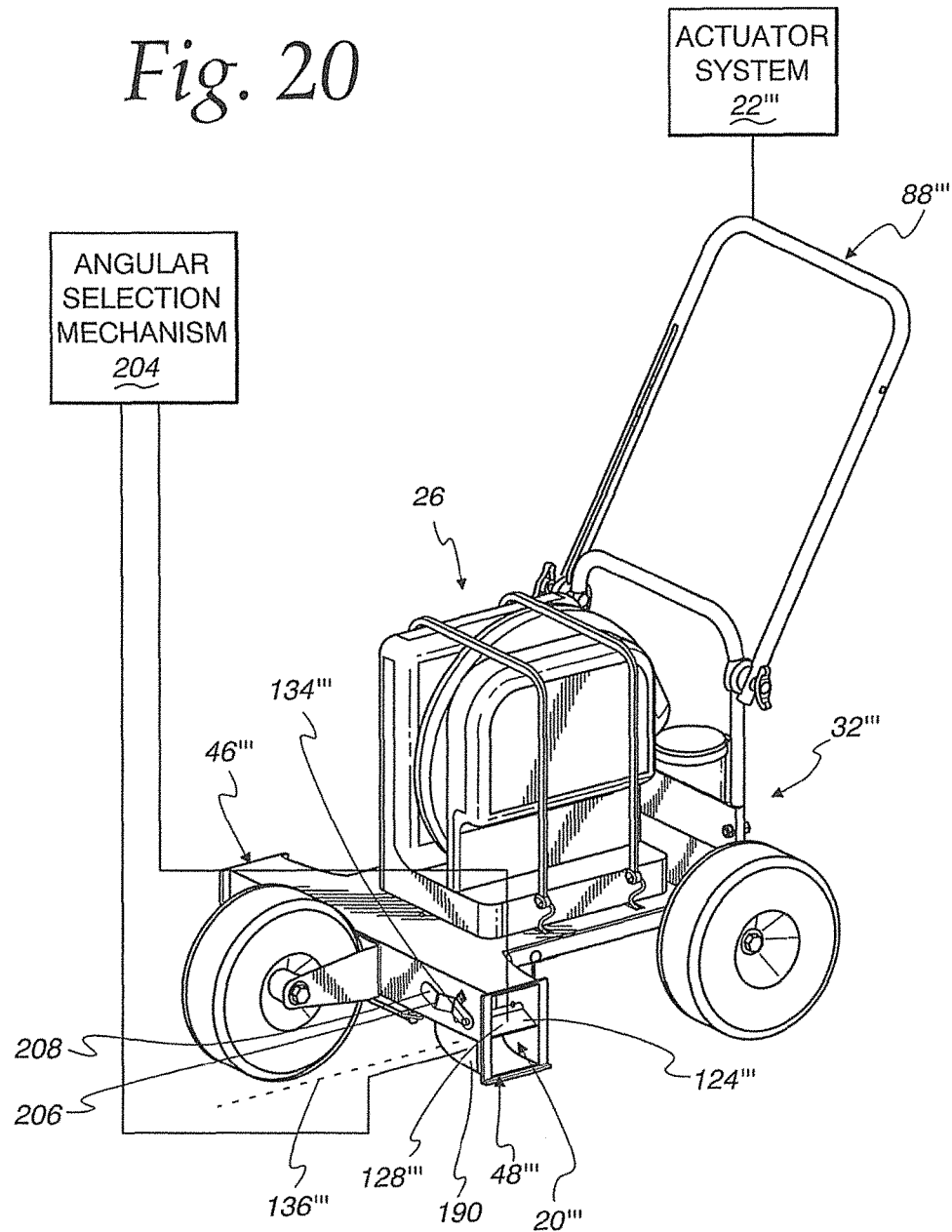
FIG. 20 is a view as in FIG. 15 with all of the components assembled.

In this embodiment, the vertical arc/direction of the discharging air stream is controlled by a deflector 124''' shown at the exemplary outlet 48''' in FIG. 20. A similar deflector (not shown) is provided at the other outlet 46''' to cooperate in the same manner.

The deflector 124''' is in the form of a flat wall 128''' that is pivotable through a post 134''' about an axis 136''' through a plurality of different positions.

A suitable angular selection mechanism, as shown schematically at 204 in FIG. 20, acts between the main body 190 and the deflector 124''' to maintain different angular positions for the deflector 124'''. The selection mechanism 204 may be of any conventional construction to allow different pre-selected angular positions to be maintained or to allow universal selection of angles within the full operating range for the deflector 124'''.

An actuator 206 is fixed to, and projects radially away from, the mounting post 134''' and is repositionable by an operator to pivot the deflector 124'''. In this embodiment, the actuator 206 has a graspable tab 208 which facilitates manual movement thereof. A remote actuator 210 is also contemplated, such as one incorporated into the handle assembly 88''' together with, or separate from, the actuator system 22'''.

With the above-described structure, a user has the option of using the carrying unit 32''' with or without the deflector units 188a, 188b. With the deflector units 188a, 188b removed, the direction of the discharging air stream may be controlled in a vertical arc through repositioning of the deflectors 124''', 126''' from a neutral, horizontal position, as shown in solid lines for the corresponding deflector 124 in FIG. 10, to a downwardly angled position, as shown by the dotted line position for the deflector 124 in that same Figure. As noted, this downward inclination may be limited to a single position or set to be anywhere within a full range of different possible positions.

When it is desired to use the deflector units 188a, 188b, the deflectors 124''', 126''' are placed in their neutral, solid line position (corresponding to that for the deflector 124) so as not to significantly obstruct discharging air flow volume. Repositioning of the deflector 124''', 126''' from its neutral position has the incidental effect of reducing the discharge volume of the pressurized air stream.

In all other respects, the carrying unit 32''' is functionally the same as the carrying unit 32 and cooperates with the source of pressurized air 26 in substantially the same manner.

The foregoing disclosure of specific embodiments is intended to be illustrative of the broad concepts comprehended by the invention.

The invention claimed is:

1. A carrying unit for a source of pressurized air, the carrying unit comprising:
   a frame;
   at least one wheel on the frame through which the frame can be supported upon and moved over a subjacent support surface; and
   a pressurized air handling system comprising a conduit assembly on the frame and having an inlet for receiving pressurized air from a source and first and second spaced outlets for discharging pressurized air directed through the inlet,
   the pressurized air handling system further comprising an air control system,
   the air control system changeable selectively into different states, changing states of the air control system causing at least one of: a) a different volume of air from the inlet to be directed to the first and second outlets; and b) a change in a direction of air discharging from one of the outlets,
   wherein the conduit assembly comprises a V-shaped conduit portion with legs of the "V" projecting from an apex region towards spaced free ends at which the first and second outlets are provided,
   wherein the air control system comprises a first deflector that is movable between: a) a first position wherein pressurized air directed through the inlet is delivered substantially entirely to the first outlet; and b) a second position wherein pressurized air delivered through the inlet is delivered substantially entirely to the second outlet,
   wherein the air control system comprises a second deflector that is movable between first and second positions to at least one of: a) change a volume of air discharging from the first outlet with the first deflector in its first position; and b) change a direction of air discharging at the first outlet with the first deflector in its first position,
   wherein the air control system comprises a third deflector that is movable between first and second positions to at least one of: a) change a volume of air discharging from the second outlet with the first deflector in its second position; and b) change a direction of air discharging at the second outlet with the first deflector in its second position,
   wherein the second and third deflectors are interconnected so that movement of one of the second and third deflectors causes movement of the other of the second and third deflectors.

2. A carrying unit for a source of pressurized air, the carrying unit comprising:
   a frame;
   at least one wheel on the frame through which the frame can be supported upon and moved over a subjacent support surface; and
   a pressurized air handling system comprising a conduit assembly on the frame and having an inlet for receiving pressurized air from a source and first and second spaced outlets for discharging pressurized air directed through the inlet,
   the pressurized air handling system further comprising an air control system,
   the air control system changeable selectively into different states, changing states of the air control system causing at least one of: a) a different volume of air from the inlet to be directed to the first and second outlets; and b) a change in a direction of air discharging from one of the outlets,
   wherein the conduit assembly has a main body and the air control system further comprises a first deflector unit configured to be connected to the main body and to change a direction of air discharging from the first outlet to a first direction,
   wherein the air control system further comprises a second deflector unit configured to be connected to the main body in place of the first deflector unit and to change a direction of air discharging from the one outlet from the first direction to a second direction.

3. A carrying unit for a source of pressurized air, the carrying unit comprising:
   a frame;
   at least one wheel on the frame through which the frame can be supported upon and moved over a subjacent support surface; and
   a pressurized air handling system comprising a conduit assembly on the frame and having an inlet for receiving pressurized air from a source and first and second spaced outlets for discharging pressurized air directed through the inlet,
   the pressurized air handling system further comprising an air control system,
   the air control system changeable selectively into different states, changing states of the air control system causing at least one of: a) a different volume of air from the inlet to be directed to the first and second outlets; and b) a change in a direction of air discharging from one of the outlets,
   wherein the carrying unit has a front and rear and laterally spaced sides and the carrying unit further comprises a handle assembly with at least one gripping region that is configured to be engaged by a user situated behind the carrying unit and at which forces can be applied by a user to reposition the carrying unit relative to a subjacent support surface,
   the carrying unit further comprising an actuator system configured to be operable by a user to change the state of the air control system,
   wherein the actuator system comprises at least one actuator element on the handle assembly that is operable to change the state of the air control system.

4. The carrying unit for a source of pressurized air according to claim 3 wherein changing of the air control system into one of the different states causes an entire volume of the pressurized air from the inlet to be directed to one of the first and second outlets.

5. The carrying unit for a source of pressurized air according to claim 3 in combination with the source of pressurized air.

6. The combination according to claim 5 wherein the source of the pressurized air is fixedly attached to the carrying unit.

7. The combination according to claim 5 wherein the source of pressurized air is fixedly attached to the carrying unit to at all times be a single unit in conjunction with the carrying unit.

8. The combination according to claim 5 wherein the source of pressurized air is configured to be supported for use on the back of a user and is configured to selectively be: a) operatively positioned on the frame: and b) changed from the operative position to become fully separated from the carrying unit to be supported on the back of a user.

9. A carrying unit for a source of pressurized air, the carrying unit comprising:
   a frame;
   at least one wheel on the frame through which the frame can be supported upon and moved over a subjacent support surface; and
   a pressurized air handling system comprising a conduit assembly on the frame and having an inlet for receiving pressurized air from a source and first and second spaced outlets for discharging pressurized air directed through the inlet,
   the pressurized air handling system further comprising an air control system,
   the air control system changeable selectively into different states, changing states of the air control system causing at least one of: a) volume of pressurized air from the inlet to be changed as directed to the first and second outlets; and b) a change in a direction of air discharging from one of the outlets,
   wherein the carrying unit has a front and rear and laterally spaced sides and the carrying unit further comprises a handle assembly with at least one gripping region that is configured to be engaged by a user situated behind the carrying unit and at which forces can be applied by a user to reposition the carrying unit relative to a subjacent support surface,
   the carrying unit further comprising an actuator system configured to be operable by a user to change the state of the air control system,
   wherein the actuator system comprises at least one actuator element on the handle assembly that is operable to change the state of the air control system.

10. The carrying unit for a source of pressurized air according to claim 9 wherein changing of the air control system into one of the different states causes an entire volume of the pressurized air from the inlet to be directed to one of the first and second outlets.

11. The carrying unit for a source of pressurized air according to claim 9 wherein changing of the air control system into one of the different states causes a different volume of air from the inlet to be directed to the first and second outlets.

12. The carrying unit for a source of pressurized air according to claim 9 in combination with a source of pressurized air.

13. The combination according to claim 12 wherein the source of he pressurized air is fixedly attached to the carrying unit.

14. The combination according to claim 12 wherein the source of pressurized air is fixedly attached to the carrying unit to at all times be a single unit in conjunction with the carrying unit.

15. The combination according to claim 12 wherein the source of pressurized air is configured to be supported for use on the back of a user and is configured to selectively be: a) operatively positioned on the frame; and b) changed from the operative position to become fully separated from the carrying unit to be supported on the back of a user.

* * * * *